United States Patent [19]

Shiomi et al.

[11] Patent Number: 4,626,160
[45] Date of Patent: Dec. 2, 1986

[54] UNMANNED TRANSFER SYSTEM FOR TRANSFERRING WORKS TO MACHINING TOOLS

[75] Inventors: Tadataka Shiomi; Kouichi Nabika, both of Gifu; Takashi Kawagoe, Shiga, all of Japan

[73] Assignee: Murata Kikai Kabushiki Kaisha, Kyoto, Japan

[21] Appl. No.: 725,367

[22] Filed: Apr. 22, 1985

Related U.S. Application Data

[63] Continuation of Ser. No. 380,813, May 21, 1982, abandoned.

[30] Foreign Application Priority Data

May 24, 1981 [JP] Japan ................................ 56-79005

[51] Int. Cl.⁴ ............................................. B65G 1/04
[52] U.S. Cl. .................................. 414/222; 198/345; 414/749; 414/268
[58] Field of Search ................ 901/1, 6; 414/222–225, 414/267, 268, 264, 273, 675; 198/345; 104/26, 26 B, 249, 252; 267/60, 71

[56] References Cited

U.S. PATENT DOCUMENTS 4,035,904 7/1977 Ishizaka et al. ..................... 414/222

Primary Examiner—Terrance L. Siemens
Attorney, Agent, or Firm—Spensley Horn Jubas & Lubitz

[57] ABSTRACT

An unmanned transfer system for transferring necessary materials such as works or tools between the racks of an automatic warehouse and machining tools. The unmanned transfer system includes a plurality of machining tools which are arranged along the racks stored with the works to be supplied to the machining tools. Further included is a stacker crane which is adapted to run between the racks and the machining tools. A plurality of auto-pallet changers are interposed between the stacker crane and the machining tools for automatically transferring the works between the stacker crane and the machining tools.

1 Claim, 10 Drawing Figures

FIG. 2
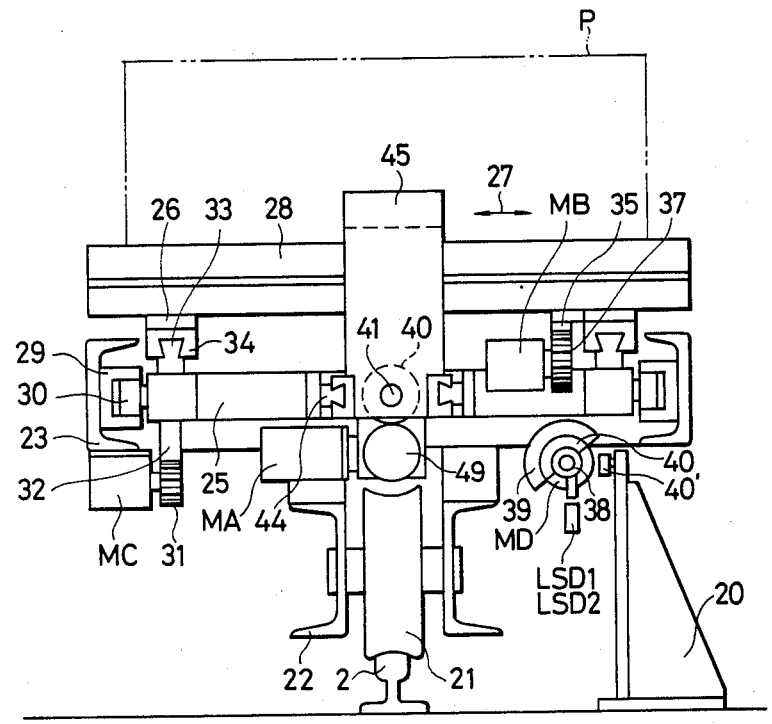
FIG. 3
FIG. 4
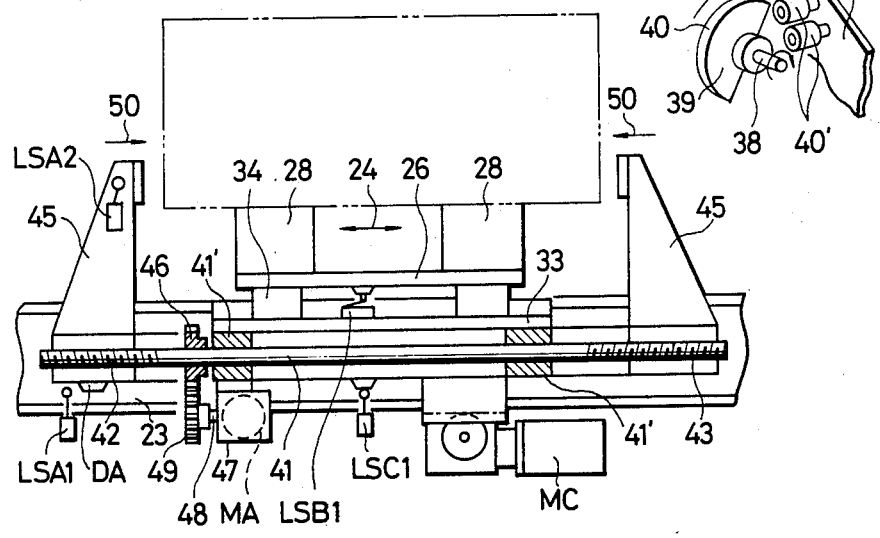

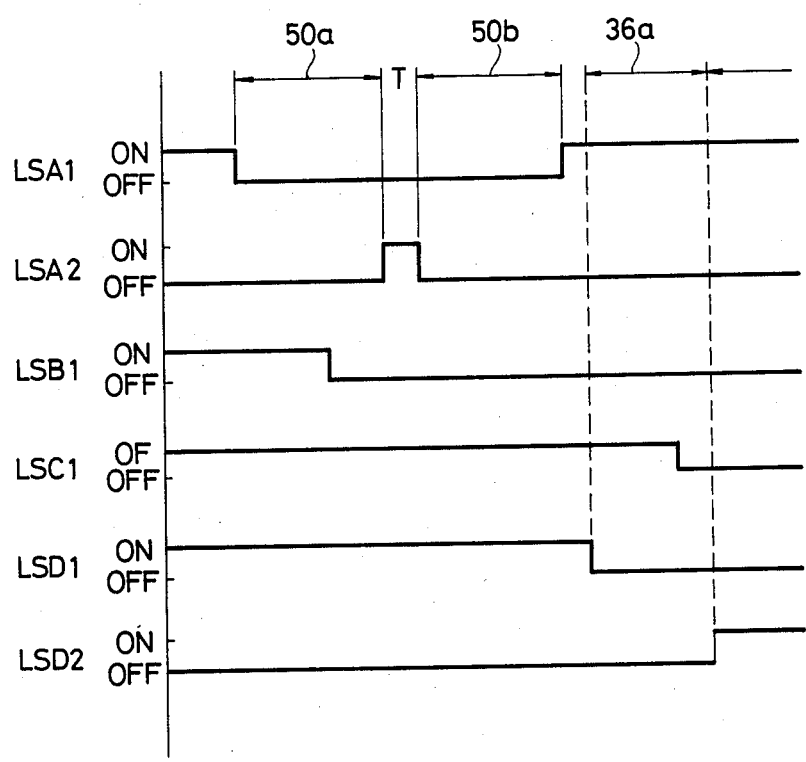

UNMANNED TRANSFER SYSTEM FOR TRANSFERRING WORKS TO MACHINING TOOLS

This is a continuation of application Ser. No. 380,813, filed on May 21, 1982, now abandoned.

BACKGROUND OF THE INVENTION

The present invention relates to an unmanned transfer system and, more particularly, to an unmanned transfer system for transferring necessary materials such as works or tools between the racks of an automatic warehouse and machining tools.

SUMMARY OF THE INVENTION

It is an object of the present invention to provide an unmanned transfer system which has its construction and process simplified and its efficiency improved by making it possible to directly transfer necessary materials such as works or tools between a stacker crane for warehousing, delivering or other purposes and machining tools with the aid of auto-pallet changers.

According to a feature of the present invention, there is provided an unmanned transfer system for transferring works to machining tools, which system comprises: a plurality of machining tools arranged along racks stored with works to be supplied to said machining tools; a stacker crane adapted to run between said racks and said machining tools; and a plurality of auto-pallet changers interposed between said stacker crane and said machining tools for automatically tranferring said works between said stacker crane and said machining tools.

The system according to the present invention uses both centering pushers for centering the pallet with respect to the transverse carriages on the lift and a centering cam for positioning the traverse carriages with respect to the target auto-pallet changer so that positioning is influenced by neither the precision with which the stacker crane is stopped nor the chatterings of the lift and the guide roller. Moreover, even if the pallet transferred from the warehouse to the slide fork of the crane is placed offset the center of the slide fork, the system of the present invention can precisely position the pallet on the auto-pallet changer with a positioning precision sufficiently ranging within ±0.5 mm. Furthermore, since the crane is equipped with the positioning mechanism, a number of the auto-pallet changers can be handled by means of a single positioning mechanism in an economical manner.

The works can be directly transferred from the stacker crane to the machining tools through the auto-pallet changers in an automatic manner. As a result, the transfer time can be shortened, and any carts for warehousing and delivering purposes can be dispensed with to simplify process control so that the system can be unmanned to reduce mistakes in management and so that the cost for the whole system can be reduced.

BRIEF DESCRIPTION OF THE DRAWINGS

Other objects and advantages of the present invention will become apparent from the following description made with reference to the accompanying drawings, in which:

FIGS. 2 and 3 are side and front elevations showing a positioning mechanism of a crane to be used in the embodiment shown in FIG. 1;

FIG. 4 is a perspective view showing a centering cam to be used in the mechanism of FIGS. 2 and 3

FIGS. 5-b to 5-d are sections taken along lines I—I, II—II and III—III of FIG. 5;

FIG. 7 is a time chart of respective switches for processes of positioning a pallet on the crane with respect to auto-pallet changers.

DESCRIPTION OF THE PREFERRED EMBODIMENT

Figure 1:
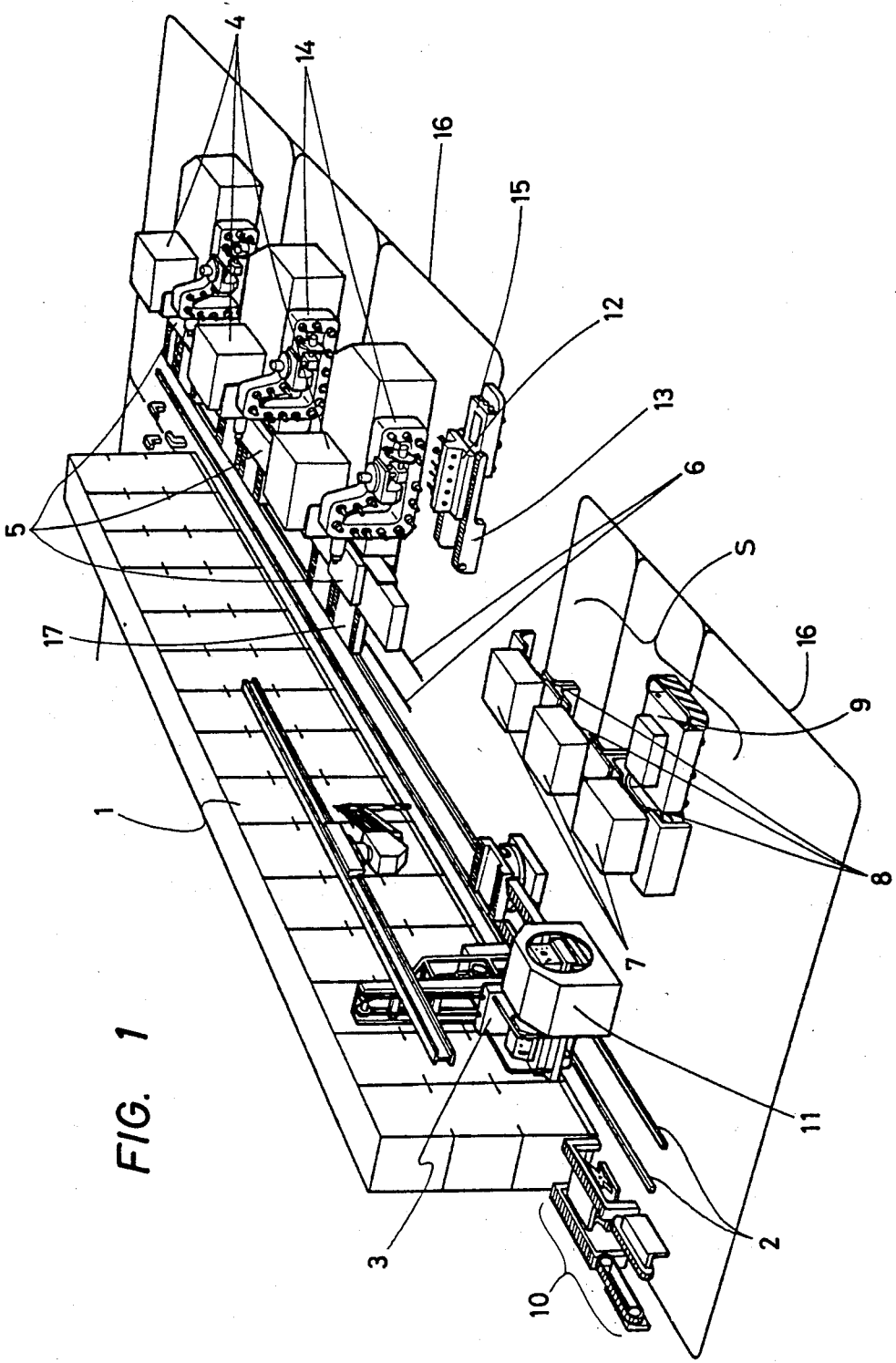
FIG. 1 is a perspective view showing the overall construction arrangement of an unmanned transfer system according to one embodiment of the present invention.

In FIG. 1 showing the overall construction arrangement of the present invention in a perspective view, reference numeral 1 indicates racks of an automatic warehouse or the like for storing necessary materials such as works or tools. In front of the racks 1, there runs a stacker crane 3 which is guided by rails 2. A plurality of machining tools 4 such as machining centers are arranged in front of and along the racks 1. Between the machining tools 4 and rails 2 thus arranged, there are arranged a plurality of auto-pallet changers 5 (which will hereinafter be referred to as "APCs") The works or the like are usually set in predetermined positions on a pallet and are stored in the racks 1.

The APCs 5 are used to transfer a pallet loaded with a work from the stacker crane 3 to the machining tools 4. An APC 5 may be provided for each respective machining tool, but one or two (or more) APCs may be arranged for a plurality of machining tools so that they may be subjected to control as a group. In the case of such group control, it is necessary to interpose rails 6 between the machining tools 4 and the rails 2, so that the APCs 5 may run alongside the rail 2, and it is desired that the height of the pallet receiving beds of the APCs 5 can be automatically adjusted in accordance with the height of tables or the like at the side of the machining tools.

Letter S indicates a setting area in which works 7 are set or precisely positioned on pallets 8. The pallets 8 thus set are carried by an automatic trailer 9 to a warehousing and delivering station 10. Numeral 11 indicates a chip remover which is arranged at the side portion of the rails 2 for removing the chips or the like of the works having been machined. Numeral 12 indicates a tool magazine for temporarily storing the tools to be supplied to the machining tools 4. The tool magazine 12 is placed on a magazine table 13 at the side of the machining tools so that it may supply the tools to tool interchanging robots 14. The tool magazine 12 is carried by an automatic trailer 15 to a magazine station for effecting the interchanges of the tools to the magazine 12 itself. The respective automatic trailers 9 and 15 are made operative to run by the guidance lines 16 which are formed on the floor.

The procedures for transferring the works by means of the unmanned transfer system according to the present invention will be described in the following. The works 7 having been set on pallets 8 are carried by the automatic trailer 9 to the warehousing and delivering station 10, from which they are further carried by the stacker crane 3. This stacker crane 3 functions to carry the works to the racks 1 and to take the works 7 out of the racks 1 and carry them to the front of the machining tool 4 in response to the command from the machining tools 4. The APCs 5 are arranged in front of the machining tools so that the works are precisely stopped at predetermined positions in front of those APCs 5. When the stacker crane stops, the fork at the side of the crane carrying the pallets loaded with the works advances toward a conveyor 17 for the APCs 5 so that the pallets are received at the sides of the APCs 5 by the vertical motions of the conveyor 17. The relationship in height between the conveyor 17 and the fork is adjusted in advance by the vertical motions of the conveyor. Subsequently, the conveyor 17 is moved up and down so that its height is adjusted to be at the same level as that of a turntable at the side of the machining tools. After that, the conveyor 17 is driven to deliver the pallets to the machining tools. In case the works having been machined are to be returned to the racks, the processes thus far described are followed in the opposite direction. The operations thus far described, the drives of the automatic trailers 9 and 15, the warehousing and delivering control, the tool supplying control are controlled as a whole by means of a computer.

A special problem to be raised in the transfer system thus far described is the operation to position the works on the stacker crane and the APCs. Turning now to FIGS. 2 to 4 showing the positioning mechanism, numeral 20 indicates a positioning guide at the side of the APCs, and numeral 21 indicates crane wheels which are attached to a frame 22 so as to run on the stacker crane (which will be hereinafter referred to as a "crane") rails 2 laid in front of the racks. To a lift 23 acting as the crane body which can be moved up and down relative to the frame 22, there are attached traverse carriages 25 and 26 which can be moved in the direction of arrows 24. To the traverse carriage 26, there is attached a slide fork 28 which is made slidable in the direction of arrows 27. As a result, the slide fork 28 is equipped with two-stepped traverse means 25 and 26 for the lift 23. More specifically, the traverse carriage 25 is equipped at both its ends with guide rollers 30, which are supported on guide rails 29 fixed to the lift 23, so that it is guided and supported by the guide rails 29. On the other hand, a pinion 31, which is attached to a motor MC fixed on the lift 23, is in meshing engagement with a rack 32 which in turn is fixed to the traverse carriage 25. With guide rails 33 which are fixed to the right and left of the traverse carriage 25, there are meshed guide grooves 34 which are formed in the bottom of the traverse carriage 26. Moreover, a rack 35 attached to the slide fork 28 is in meshing engagement with a pinion 37 which is attached to a motor MB fixed to the traverse carriage 25. The guide rails 29 and 33 and guide grooves 34 thus far described are all arranged in the directions of the arrows 24.

A centering cam 40, which is made rotatable on a pin 38 fixed on the traverse carriage 25, has a semicircular shape, as viewed from the side, and its side 39 has a taper or wedge shape. That centering cam 40 is so positioned that it can be forced in the wedge shape into the gap between two positioning rollers 40', which are juxtaposed to each other at predetermined positions on the positioning guide 20, by the rotations in the direction of arrow 36.

To the traverse carriage 25, there is attached a centering rod 41 which is borne in bearings 41'. With reversed threads 42 and 43 which are formed at both ends of said rod 41, there are meshed a pair of centering pushers 45 and 45 which are guided and supported by guide rails 44 of the traverse carriage 25.

A gear 46, which is fixed to the aforementioned centering rod 41, is in meshing engagement with a gear 49, which is fixed to a pin 48 protruding from a gear box 47, to which a motor MA is connected.

With specific reference to FIG. 3, positioning control members for the respective movable members are arranged. Specifically, a limit switch LSA1 is disposed at the side of the traverse carriage 25 for determining the closed position of the centering pusher 45 when it engages with the dog DA of the centering pusher 45. A limit switch LSA2 mounted on the aforementioned pusher 45 detects the center position of a pallet P relative to the traverse carriage 25. A limit switch LSB1 is disposed at the side of the traverse carriage 25 for centering the traverse carriage 26 relative to the traverse carriage 25 when it engages with the dog DB of the traverse carriage 26. A limit switch LSC1 is disposed at the side of the lift 23 for centering the traverse carriage 25 relative to the lift 23 when it engages with the dog DC of the traverse carriage 25.

Figure 5:
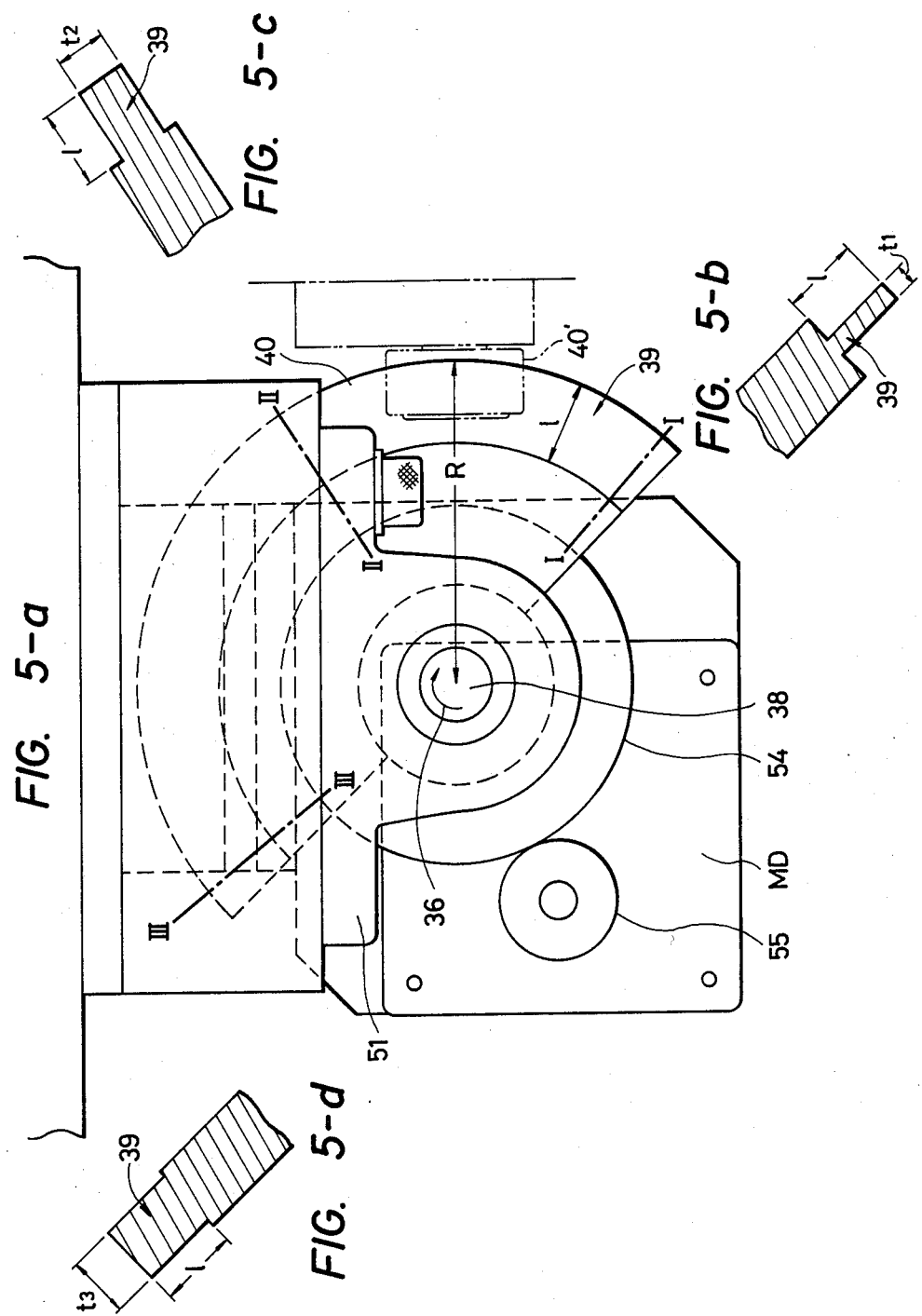
FIG. 5-a is a side elevation showing the construction of the centering cam.
Figure 6:
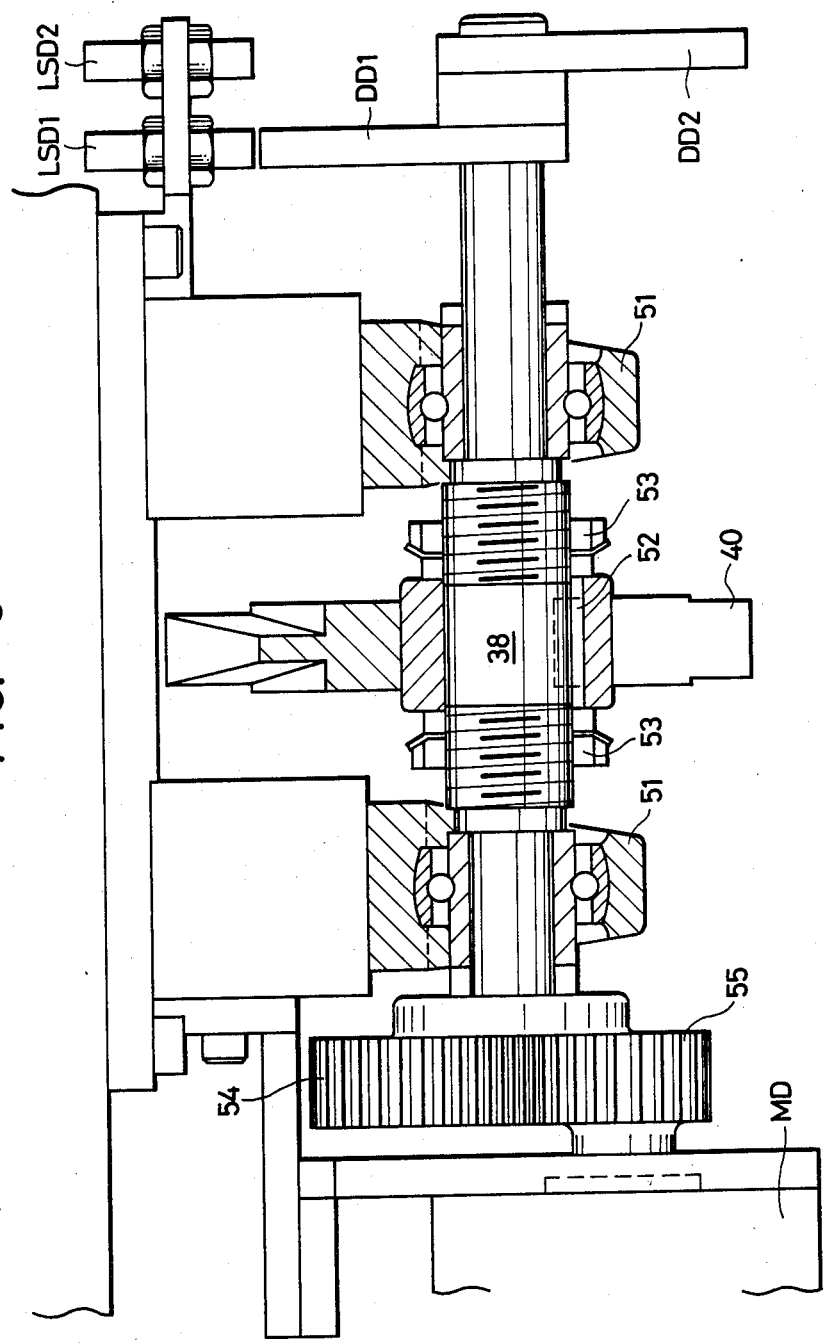
FIG. 6 is a partially sectional front elevation showing the construction of the centering cam.

Turning now to FIGS. 5 and 6, the mechanism for positioning the traverse carriage 25 with respect to the APCs is shown in an enlarged scale. Specifically, the pin 38 is rotatably supported between bearings 51 and 51 which are mounted in the lower side of the traverse carriage 25. Said pin 38 has its center portion fixing the semicircular centering cam 40 thereto by means of a key 52 and both its ends fastening lock nuts 53 and 53 so that the centering cam 40 is fixed in position to the pin 38. To one end of the aforementioned pin 38, there is fixed a gear 54 which is in meshing engagement with a gear 55 at the sided of a motor MD. To the other ends of the pin 38, there are fixed dogs DD1 and DD2 which are shifted 180 degrees in phase for actuating contactless switches LSD1 and LSE2 disposed at the side of the traverse carriage 25.

In FIG. 5-a, the centering cam 40 is formed, as has been described hereinbefore, into a semicircular shape having a radius R about the pin 38, as viewed from the side, and its band-shaped portion 39 having a width 1 metered from the outer circumference is tapered in the circumferential direction.

Referring closely to FIGS. 5-b to 5-d showing the sections of the centering cam 40 at respective positions I, II and III, the thickness of the band-shaped portion 39 having the width is continuously changed, as is expressed by equalities of $t_1 < t_2 < t_3$. By the rotations of the pin 38 in the direction of the arrow 36, more specifically, the band-shaped portion 39 advances into the gap between the paired positioning rollers 40' and 40' so that the traverse carriage 25 is positioned by the wedge action in the predetermined position between the rollers 40' and 40', i.e., with respect to the APCs. As a result, the gap between the rollers 40' and 40' is equal to or smaller the maximum width $t_3$ of the band-shaped portion 39.

Of the aforementioned respective motors, incidentally; the motor MA is a torque motor for opening and closing the centering pushers 45; the motor MB is a motor with a brake for centering the traverse carriage 26 with respect to the traverse carriage 25 at an initial unloaded staten the motor MC is a motor with a brake for centering the traverse carriage 25 with respect to the lift 23 at the initial unloaded state; and the motor MD is a motor with a brake for opening and closing the centering cam 40.

As a result, in response to the work requiring command from the machining tool, the crane is positioned to a target rack of the warehouse so that the pallet set with the designated work is transferred to the lift by the action of the slide fork. At this time, the pallet is placed while being offset from the center of the slide fork, and the crane loaded with the pallet is moved to a designated APC, at which the positioning operation is stopped. The positioning operation at this time is so coarse as to have a level of about ±5 mm. When the crane is stopped, the brake of the motor MB is released, and the motor MA is energized to rotate the centering rod 41 through the gear box 47 and the gears 49 and 46 so that the centering pusher 45 is moved in the directions of arrows 50 and 50 by the actions of the thread 42 and 43, whereby the pallet P is precisely centered at a predetermined position with respect to the traverse carriage 25. At this time, the brake of the motor MB is applied to lock the traverse carriage 26 with respect to the traverse carriage 25. At this time, the pallet P is centered relative to the traverse carriage 25. Then, the brake of the motor MC is released, and the centering cam 40 is rotated in the direction of the arrow 36 into meshing engagement with the positioning rollers 40' and 40' so that the traverse carriage 25 is precisely positioned relative to that particular APC. By the operations thus far described, the pallet P is precisely positioned relative to the APC through the traverse carriages 25 and 26.

Turning now to FIG. 7, more specifically, when the pallet is delivered from the warehouse so that the crane is stopped at the position of the designated APC, the respective limit switches LSA1, LSB1, LSC1 and LSD1 are at their ON states. In accordance with the movement of the centering pusher 45, the limit switch LSA1 is turned off. In accordance with the movement 50a of the traverse carriage 26, the limit switch LSB1 is turned off. Within a time period T after the limit switch LSA2 has been turned on, the pallet is centered with respect to the traverse carriage 25, and the pushers 45 are then returned to their initial positions, as indicated at 50b, by the reverse rotations of the motor MA. When the limit switch LSA1 is again turned on, the motor MD drives the centering cam 40 into the gap between the rollers 40' and 40', as indicated at 36a. At the position of the 180 degree rotation, the contactless switch LSD2 is turned on to stop the rotations of the motor MD so that the traverse carriage 25 is centered with respect to the APC. Meanwhile, the limit switch LSC1 is turned off in accordance with the movement of the traverse carriage 25.

We claim:

1. An apparatus for positioning a carriage-supported pallet with respect to a pallet station comprising:

positioning means for establishing the relative positions of said pallet and said carriage;

first alignment means associated with said carriage;

second alignment means associated with said pallet station;

said first and second alignment means being mechanically engageable to thereby establish the relative positions of said carriage and said pallet station, wherein;

said first alignment means comprises a rotatable semicircular cam having a tapered surface;

said second alignment means comprises a pair of rollers between which said cam may be introduced;

whereby rotation of said cam through said rollers causes said tapered surface to become wedged between said rollers, thereby fixing the position of said carriage with respect to said pallet.

* * * * *